US006587497B1

(12) United States Patent
Libby et al.

(10) Patent No.: US 6,587,497 B1
(45) Date of Patent: Jul. 1, 2003

(54) BIREFRINGENCE COMPENSATION USING A SINGLE PUMP

(75) Inventors: Stuart I. Libby, Eglin AFB, FL (US); Craig A. Denman, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/493,508

(22) Filed: Jan. 28, 2000

(51) Int. Cl.$^7$ .............................................. H01S 3/08
(52) U.S. Cl. ........................................ 372/99; 372/94
(58) Field of Search .......................... 372/33, 94, 92, 372/99

(56) References Cited

U.S. PATENT DOCUMENTS

| | | | | |
|---|---|---|---|---|
| 5,099,486 A | * | 3/1992 | Acharekar | 372/32 |
| 5,504,763 A | | 4/1996 | Bischel et al. | 372/33 |
| 5,638,397 A | * | 6/1997 | Nighan | 372/92 |
| 6,016,324 A | * | 1/2000 | Rieger | 372/25 |

OTHER PUBLICATIONS

Q. Lu, N. Kugler, H. Wever, S. Dong, N. Muller, and U. Wittrock, "A novel approach for compensation of birefringence in cylindrical Nd:YAG rods," Opt. and Quantum Elect. 28, 57–69 (1996).
Bennett, Glenn T., "Full paraxial thermal focussing and birefringence compensation in uniformly pumped Nd:YAG rods,".
C. A. Denman and S. I. Libby, "Birefringence compensation using a single Nd:YAG rod," OSA TOPS vol. 26, 608–612 (1999) Advanced Solid–State Lasers, Martin M. Fejer, Hagop Injeyan, and Ursula Keller (eds.).
M. P. Murdough and C. A. Denman, "Mode–volume and pump–power limitations in injection–locked $TEM_{00}$ Nd:YAG rod lasers," App. Opt. 35, 5925–5936 (1996).
S. Jackel, I. Moshe, and R. Lallouz, "Dynamic compensation of thermal lensing and birefringence in high average power, Nd:Cr:GSGG lasers using a Variable Radius Mirror and a Reentrant Resonator," OSA TOPS vol. 19 Advanced Solid–State Lasers, ed. Bosenberg and Fejer, 384–387 (1998).
Sherman, James, "Thermal compensation of a cw–pumped Nd:YAG laser," Applied Optics, vol. 37, No. 33, 7789–7796, Nov. 20, 1998.
Advanced Solid State Lasers Conf., Feb. 1–3, 1999 where the Denman/Libby paper was presented.

* cited by examiner

Primary Examiner—Paul Ip
Assistant Examiner—Gioacchino Inzirllo
(74) Attorney, Agent, or Firm—James M. Skorich; Kenneth E. Callahan

(57) ABSTRACT

A new birefringence compensation scheme that requires only a single rod was implemented and modeled. This new scheme uses a single pump head, a Faraday rotator, and a curved mirror. An analytic expression to accurately determine the position of the curved mirror given its radius of curvature was presented. Dramatic performance enhancements due to the birefringence correction were obtained. A new configuration for a birefringence compensated amplifier mirror and an injection-locked ring resonator using this birefringence compensated amplifier mirror was also presented.

4 Claims, 5 Drawing Sheets

A: rod entrance face.   B: curved mirror.   C: high reflectance mirror plane

BIREFRINGENCE COMPENSATION USING A SINGLE PUMP

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

The invention relates to a system for minimizing depolarization due to thermally induced stress birefringence in a solid state gain medium used in laser amplifiers and resonators.

2. Description of the Prior Art

Excitation of the gain medium, such as a Nd:YAG rod, used in high power laser amplifiers generates significant heat that thermally distorts the medium and induces stress birefringence.

This creates depolarization losses in polarization dependent cavities. By implementing a birefringence compensation scheme, an increased output power and a higher polarization contrast ratio can be obtained over the uncompensated cavity. A well-known method of birefringence compensation is to use two identical cylindrical rods spaced by a 90°-quartz rotator. In this scheme, the light's polarization is rotated 90° between the two rods so that the beam's radial (r) and tangential ($\phi$) polarizations are exchanged and thus each experience both indices of refraction, $n_r$ and $n_\phi$. However, because the polarizations focus at different rates after the first rod, the r and $\phi$ mode volumes become non-equivalent in the two rods. Consequently, the birefringence compensation becomes incomplete and less effective with increased pump powers. Lu et al. identified this problem and offered a solution by including an imaging optic into the above compensation scheme. [Q. Lu, N. Kugler, H. Wever, S. Dong, N. Muller, and U. Wittrock, "A novel approach for compensation of birefringence in cylindrical Nd:YAG rods," Opt. and Quantum Elect. 28, 57–69 (1996).] With this imaging optic, theoretically perfect birefringence compensation is possible at all pump powers.

Another compensation scheme is detailed in U. S. Pat. No. 5,504,763. A phase conjugate mirror is used to reverse wavefront distortions. At high laser power significant birefringence is created that induces strong depolarization effects in the beam. Since the phase conjugate mirror is dependent on the polarization purity of the incoming beam, a relay imaging means, a faraday rotator, and a flat reflector are used to compensate for the birefringence caused depolarization. While this system discloses the concept of using a relay imaging means in the birefringence scheme, it remains relatively complex without reference to the use of a single concave mirror with a precisely defined position. In fact, the '763 patent makes reference to the simplest embodiment as two identical lenses with a mirror. Additionally, the present invention further distinguishes itself from this patent with the disclosure that the r and $\phi$ polarized modes are of equal size on the output side of the gain medium. The present invention further discloses that this fact can be used for spatial mode control and the development of ring laser and amplifier designs. [C. A. Denman and S. I. Libby, "Birefringence compensation using a single Nd:YAG rod," OSA TOPS Vol. 26, 608–612 (1999) Advanced Solid-State Lasers, Martin M. Fejer, Hagop Injeyan, and Ursula Keller (eds.)]

Accordingly, it is an object of the present invention to introduce a simplified single gain medium (pump-head) implementation of a birefringence compensation scheme that minimizes the thermally induced depolarization loss. It is another object of the present invention to disclose attributes of the system and to provide an approach for optimal use of the gain medium volume and mode size for spatial mode control. It is a further object of the present invention to provide an approach for using the subject birefringence implementation in a ring laser resonator and amplifier configuration.

SUMMARY OF THE INVENTION

The present invention is a single pump-head birefringence compensation scheme using a 45° Faraday rotator located between the pump head (Nd:YAG rod) and a concave mirror. The concave mirror serves as a focusing element that ensures that each ray of the laser beam is reflected directly back on itself and passes through the pump head rod in exactly the same position as its incident path. Therefore, the properties of the reflected r and $\phi$ polarized modes will be the same as the original modes. Upon a double pass of the 45° Faraday rotator, the polarization of the beam is rotated by 90 degrees and the beam's radial (r) and tangential ($\phi$) polarizations are exchanged. Consequently, equivalent mode volumes are reciprocated and each laser beam ray experiences both indices of refraction with equal focus upon completion of a double pass of the rod. In this manner, the r and $\phi$ polarized modes become identical (their mode spot size and radius of curvature as a function of position become identical not their polarization state) after a double pass of the rod. Because of this fact, resonator or amplifier optics on this side of the rod can be changed or adjusted to alter the modes volume within the rod so as to optimize the laser's spatial-mode performance without affecting or changing any of the rotation is used before reentering the rod, the lasing mode within the rod does not form a standing wave, thus alleviating the problem of spatial hole burning. Hence, a polarized birefringence compensated single-frequency lasing mode oscillates as though it is in a standard ring oscillator configuration. A Y-cavity implementation and an injection-locked laser ring configuration are presented.

DESCRIPTION OF THE PREFERRED EMBODIMENT

A new single pump-head implementation of a birefringence compensation scheme is introduced using a single laser pump-head with a 45° Faraday rotator and curved (concave) mirror. Two cavity configurations are introduced and modeled. The implementation scheme is experimentally verified.

Figure 1:
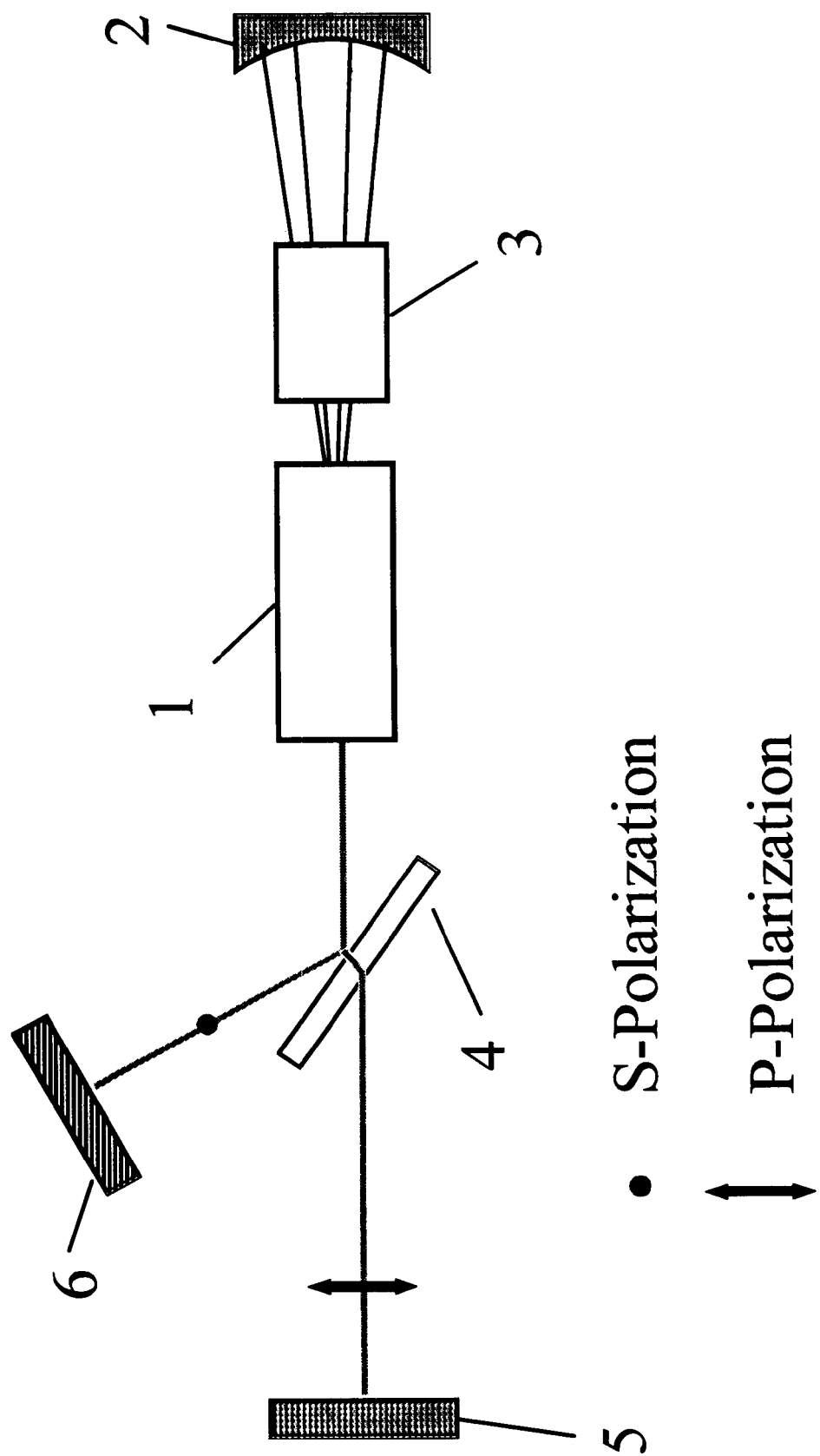
FIG. 1 shows the Y-cavity resonator configuration for birefringence compensation.

A Y-cavity implementation of the birefringence scheme is presented in FIG. 1. This cavity consists of a single laser pump head 1 (e.g., a Nd:YAG rod), a concave mirror 2, a 45° Faraday rotator 3, a thin-film polarizer 4 (TFP), and an output coupler 5 and a high reflectance mirror 6 (HR). The concave mirror serves as the focusing element to ensure each laser beam ray is reflected directly back on itself and propagates through the rod via the exact same path as its incident path. Thus, equivalent mode volumes are reciprocated and each laser beam ray experiences both indices of refraction with equal focus on a double pass of the solid state rod.

In a steady-state mode, a laser beam emitted by the solid state pump head 1 passes through the Faraday rotator 3, is reflected by the concave mirror 2, and passes again through the Faraday rotator for a total rotation of 90°. The P-polarized portion of this beam then passes through the thin film polarizer 4 (TFP) located in front of the front endface of the pump head and is output through the output coupler 5. The S-polarized portion of the beam is reflected off the TFP and off the high reflectance mirror 6 back through the pump head. It passes twice through the Faraday rotator and back through the pump head to emerge with P-polarization. Hence it passes through the thin film polarizer and out through the output coupler.

An ABCD matrix analysis is used to model the cavity including the thermo-optic properties of the Nd:YAG rod. [M. P. Murdough and C. A. Denman, "Mode-volume and pump-power limitations in injection-locked TEM$_{00}$ Nd:YAG rod lasers," App. Opt. 35, 5925–5936 (1996)]. This model enables study of the laser mode and stability criteria as it propagates through the cavity. An analytic expression can be obtained for the placement of the curved mirror:

$$d = f - \frac{l}{2n_o} + \left[f^2 - \left(\frac{l}{2n_o}\right)^2\right]^{1/2} + l_r\left(\frac{n_r - 1}{n_r}\right) \quad (1)$$

Where d is the distance from the pump head back end (closest to the curved mirror) to the curved mirror, f is the focal length of the curved mirror, l is the rod active length, $n_o$ is the index at the center of the rod, and $l_r$ and $n_r$ are the rotator crystal length and index, respectively. This expression is identical to that found in the paper by Lu et al. except for the last term which accounts for the presence of the Faraday rotator.

Note that this expression is independent of the rod photoelastic coefficients illustrating the perfect birefringence compensation for the entire pump range using a single position of the curved mirror. This result can be contrasted to the work of Jackel et al. where a variable radius mirror was used to obtain birefringence correction in lieu of using a precise positioning of a fixed radius of curvature mirror. [S. Jackel, I. Moshe, and R. Lallouz, "Dynamic compensation of thermal lensing and birefringence in high average power, Nd:Cr:GSGG lasers using a Variable Radius Mirror and a Reentrant Resonator," OSA TOPS Vol. 19 Advanced Solid-State Lasers, ed. Bosenberg and Fejer, 384–387 (1998)].

Figure 2:
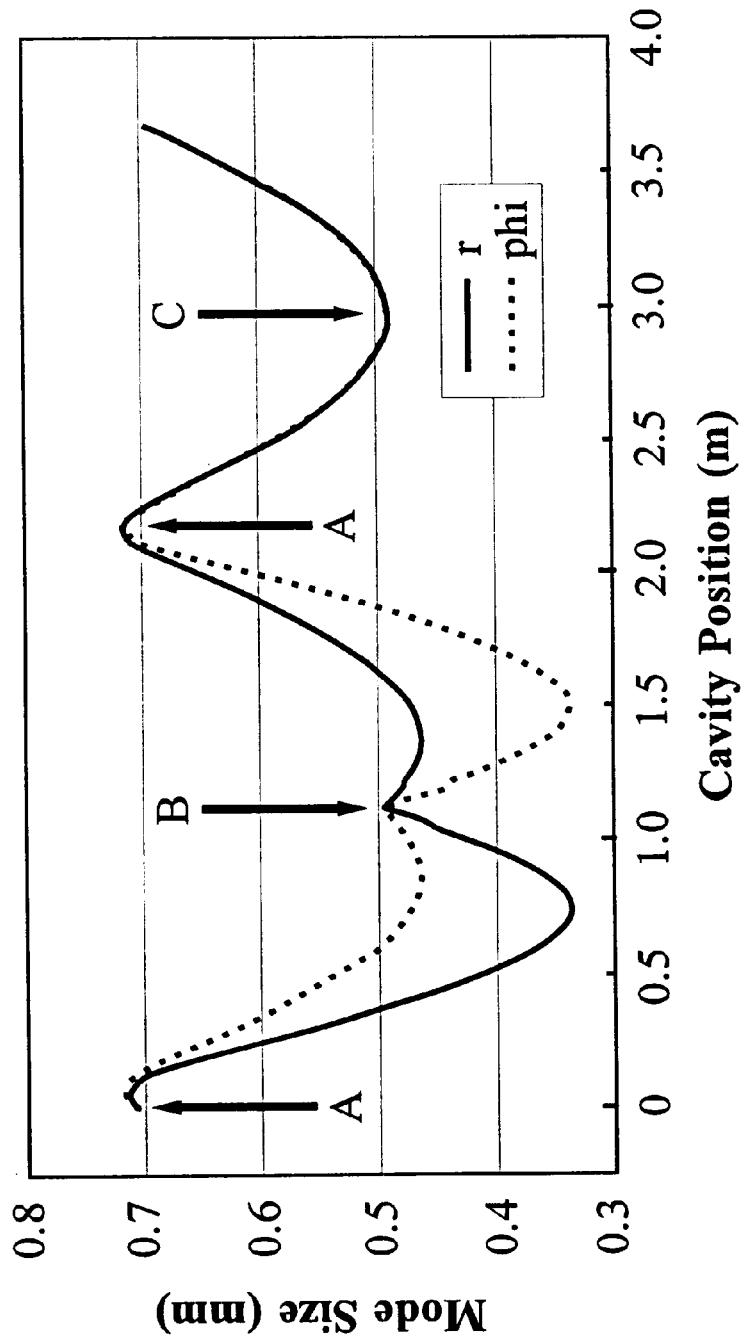
FIG. 2 is a plot of the r and $\phi$ polarized mode spot sizes throughout a single round-trip pass of the Y-cavity resonator.

One of the unique features of this compensation scheme is that, after analyzing the laser modes throughout the cavity as presented in FIG. 2, one finds that both r- and φ-polarized modes are of equal size at the output coupler side of the rod. Using this fact, an experiment was performed to verify the proper mirror placement for optimal birefringence correction. In FIG. 2 the plot starts on the left at the rod entrance face. The r and φ spots begin to separate as they are focused differently due to the rod's birefringence. The r-polarized mode is the lower and upper plotted line before and after the curved mirror, respectively. Polarization rotation occurs at the mirror plane.

Figure 3:
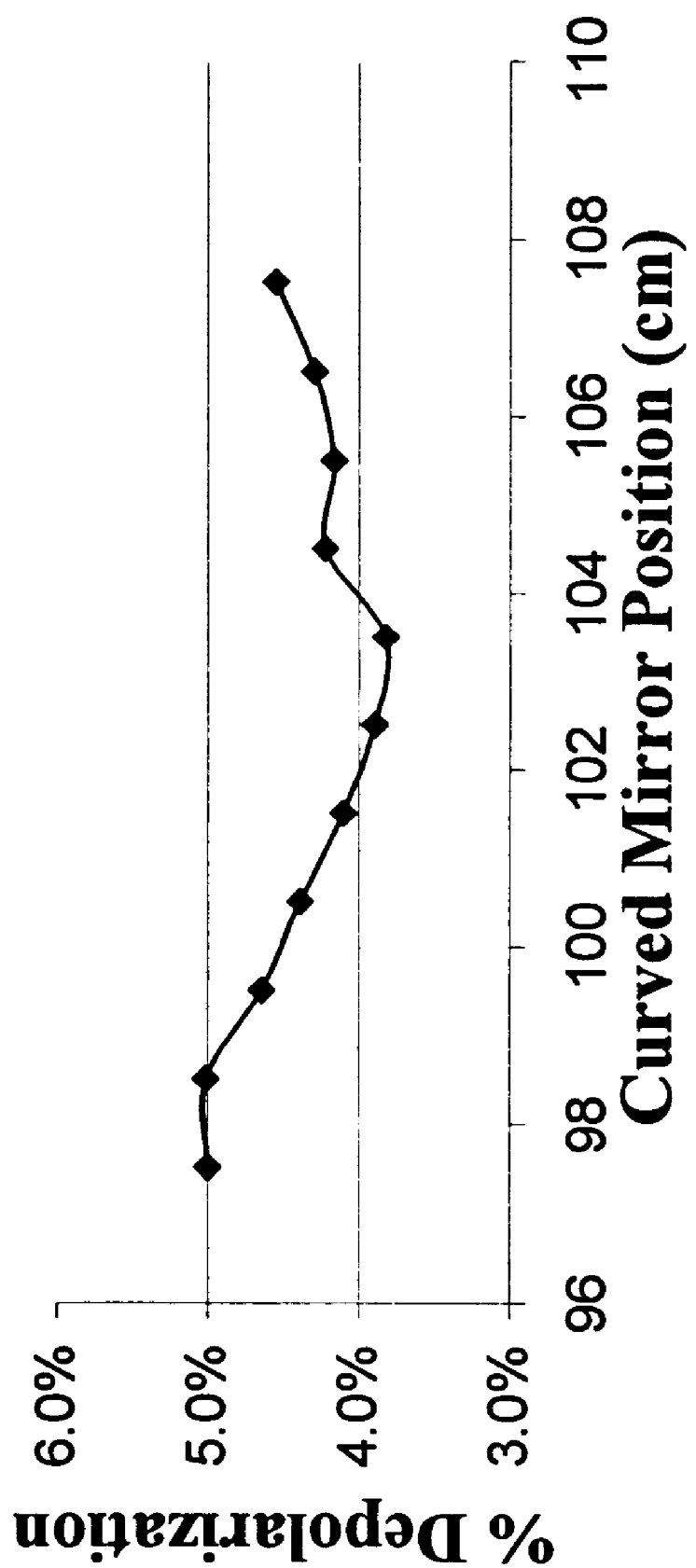
FIG. 3 is a plot of the percent depolarization vs. the curved mirror position for a coherent Antares head.
Figure 4:
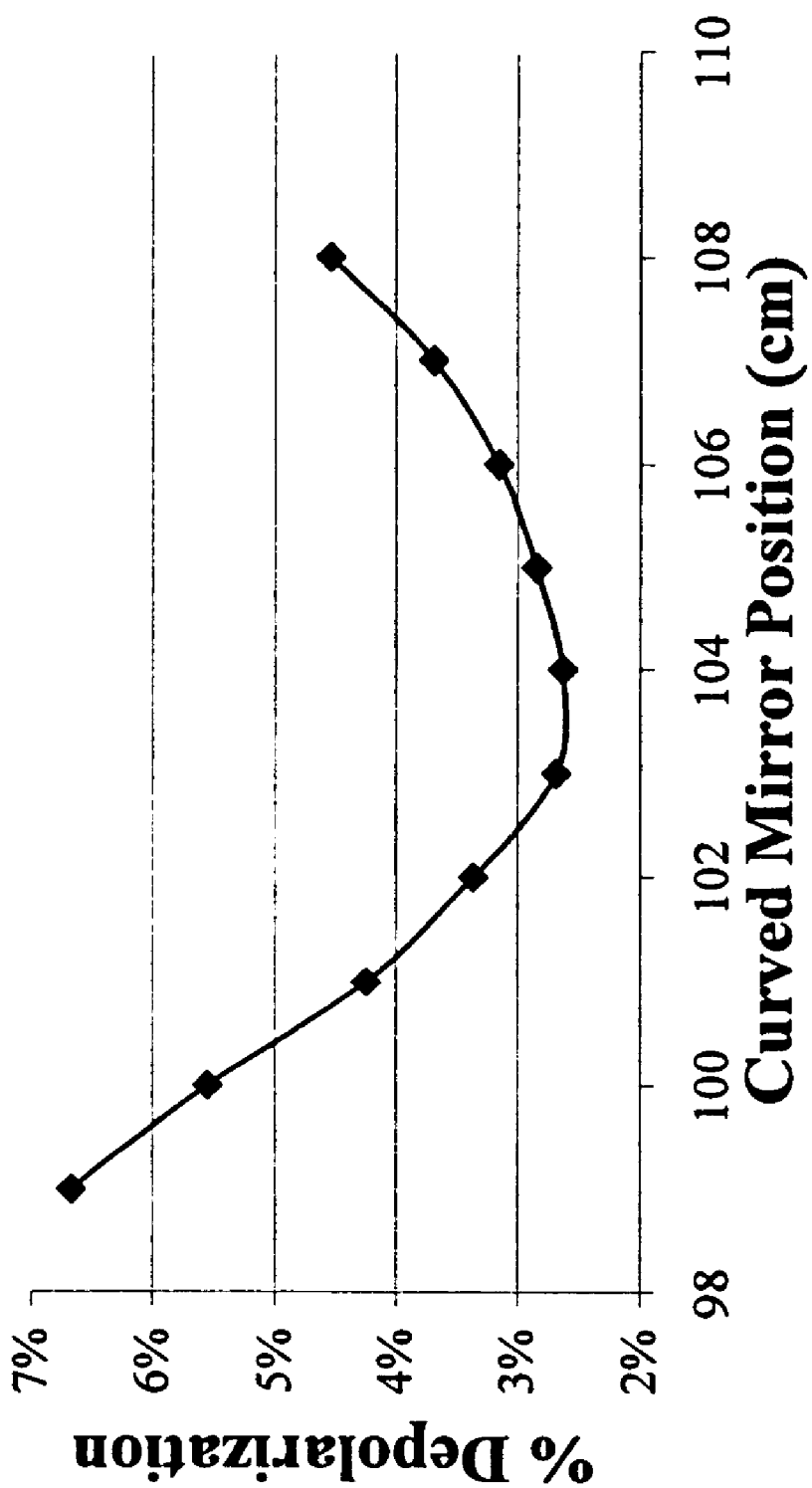
FIG. 4 is a plot of the percent depolarization vs. the curved mirror position for a Kigre head.

Removing the output coupler and mode matching a Lightwave Electronics Non-Planar-Ring-Oscillator (NPRO) through the TFP simulated the operating mode within the cavity. A measurement of the depolarization was accomplished by placing an additional 45° Faraday rotator between the TFP and the laser rod. This allowed the power in the depolarized portion of the beam to be measured in the HR-leg of the cavity as a function of the curved mirror position. Furthermore, a polarizer placed between this additional rotator and the rod allowed for an accurate absolute value of depolarization to be determined by measuring the power of the polarized portion of the beam upon its return from the rod. Values for the percent depolarization as a function of the curved mirror position are presented in FIG. 3 for the Coherent Antares head and in FIG. 4 for the Kigre head.

In addition, the degree of depolarization for the uncompensated cavity was measured for comparison. This measurement was accomplished by simply removing the compensation rotator from the configuration. In this case, the measurement rotator's polarizer extracts the depolarized power and the TFP extracts the polarized power. Also, several Y-cavity lasers were constructed to compare compensated versus uncompensated performance. Their output powers and polarization contrast ratios were measured.

Comparing the compensated and uncompensated results illustrates the degree of improvement achievable with this technique. In the uncompensated configuration, the Antares laser pump-head was 10.6% depolarized, and the Kigre head was 16% depolarized; whereas in the compensated case the Antares and Kigre heads depolarized the beam by only 3.8% and 2.6%, respectively. This is a 64% decrease in the depolarization for the Antares head, and an 84% decrease for the Kigre head. Calculated optimum mirror positions from Equation (1) were also compared to those obtained experimentally. For the Antares head, the theoretical mirror position is 103.2 cm whereas the measured position was 103.5 cm. For the Kigre head, the predicted mirror position is 104.6 cm and the measured position was 104 cm. Measured resonator performance comparisons for the Antares head yielded 22.4 W at 87:1 contrast ratio uncompensated versus 38 W at 141:1 compensated. The Kigre head yielded 39 W at 70:1 contrast ratio versus 76 W at 205:1 contrast ratio compensated.

There are at least a couple of unique features of this compensation scheme. One, as pointed out earlier, is that the r- and φ-polarized modes are of equal size at the output coupler 5 side of the rod. This means that the output coupler 5 and the HR mirror 6 can be adjusted to change the mode volume within the rod so as to optimize the laser's spatial-mode performance without affecting or changing any of the conditions for the birefringence correction.

Figure 5:
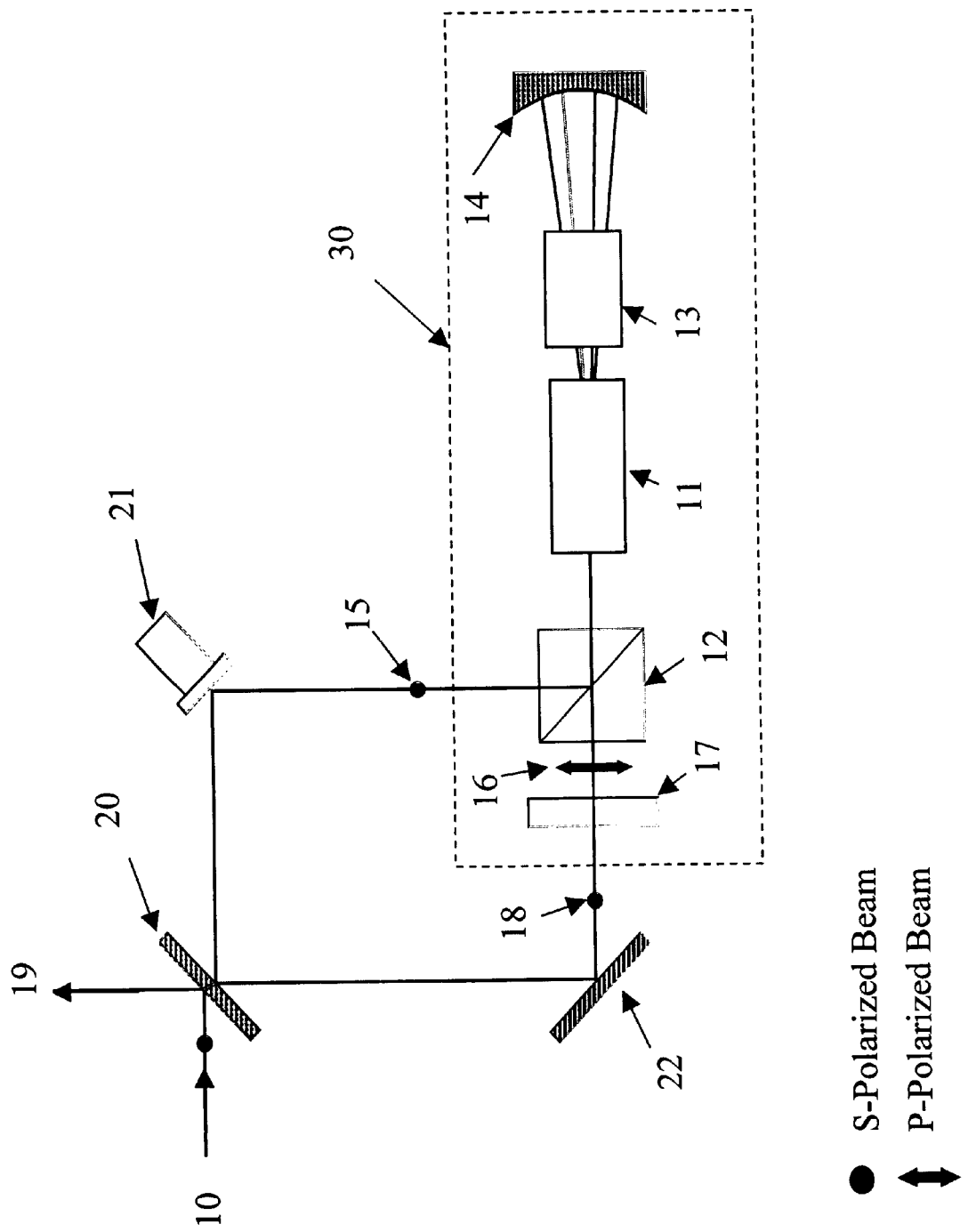
FIG. 5 shows the ring cavity configuration.

The second point is that the single head compensation lends itself readily for use in an injection-locked laser ring configuration as illustrated in FIG. 5. Because this birefringence compensation scheme rotates the polarization by 90° on the return pass through the rod, the lasing mode in this region of the cavity does not form a standing wave. Hence, the polarized single-frequency lasing mode oscillates as though it is in a standard ring configuration.

The primary feature of the laser ring of FIG. 5 is the birefringence compensated amplifier mirror 30 in which an S-polarized beam for the input and a redirected and amplified S-polarized beam forms the output.

In FIG. 5 the birefringence compensated amplifier mirror 30 forms one corner of the injection-locked laser ring. In this configuration the S-polarized master laser output 10 is directed through the input/output coupler 20 to the movable mirror (PZT mirror) 21 and is redirected to the polarizing beamsplitter 12 in the birefringence compensated amplifier mirror 30. The polarizing beamsplitter 12 then redirects the S-polarized beam through the pump head 11 and the 45° Faraday rotator 13 and is subsequently reflected by the concave mirror 14 back through the rotator and pump head. This double pass of the Faraday rotator changes the S-polarized beam into a P-polarized beam. The beamsplitter 12 passes the P-polarized portion 16 through the half-wave plate 17, which rotates it back into an S-polarized beam 18. This beam is reflected by the mirror 22 and partly reflected and partly passed through the input/output coupler 20. The four mirrors 20, 21, 30, and 22 form the laser ring containing an S-polarized beam circulating in a clockwise direction. That portion of this circulating beam that passes through the output coupler 20 forms the output 19. The purpose of the PZT mirror 21 is to adjust (in real time via an electronic feedback) the length of the ring cavity so that the single frequency longitudinal mode is at the same frequency as the master laser. Injection-locking a "slave" oscillator to a "master" oscillator is a standard technique.

The two-head scheme could be used in a ring configuration though it would generally force the ring to be overly large. Whereas, the single-head scheme of the present invention lends itself quite well. The ring can remain compact even if additional birefringence compensated amplifier mirrors 30 were to be added by replacing the two remaining mirrors 22, 21.

We claim:

1. In a polarization dependent resonator cavity, a system for minimizing depolarization of a laser beam due to thermally induced stress birefringence in a solid state gain medium, said system comprising:

a single laser pump head including the gain medium, for outputting a laser beam, with the laser beam having a polarization including an S-polarized portion and a P-polarized portion, and the pump head having a front endface and a back endface;

a concave mirror to reflect the laser beam back through the pump head, the concave mirror serving as a focusing element to ensure each ray of the laser beam is reflected directly back on itself and propagates through the pump head via the same path as its incident path;

a means for rotating the polarization of the laser beam by forty-five degrees disposed between the pump head and the concave mirror, thereby causing the laser beam polarization to be rotated by 90° before it passes back through the pump head;

the concave mirror having a focal length and being disposed at a distance d from the back endface of the pump head, with the distance d being determined by the equation:

$$d = f - \frac{l}{2n_o} + \left[f^2 - \left(\frac{l}{2n_o}\right)^2\right]^{1/2} + l_r\left(\frac{n_r - 1}{n_r}\right)$$

where:
f is the focal length of the concave mirror;
l is the active length of the pump head;
$n_o$ is the index of refraction at the center of the pump head; and
$l_r$ and $n_r$ are the crystal length and index of refraction, respectively, of the rotating means;

a polarizing beamsplitter disposed in the laser beam and located at the front endface of the pump head, that transmits the P-polarized portion and reflects the S-polarized portion, with the reflected S-polarized portion being reflected by a high reflectance mirror back through the pump head; and an output coupler to output the laser beam transmitted by the polarizing beamsplitter, thereby minimizing depolarization losses caused by birefringence in the pump head.

2. A birefringence compensated amplifier mirror for a laser beam having an incoming polarization, comprising:

a polarizing beamsplitter to redirect the laser beam;

a laser pump head through which the laser beam passes;

means for rotating polarization, through which the laser beam passes;

a concave mirror to reflect the laser beam back through the rotating means and the pump head, the laser beam thereafter having a second polarization rotated 90° from the incoming polarization such that the laser beam passes through said polarizing beamsplitter;

the concave mirror having a focal length and being disposed at a distance d from the pump head, with the distance d being determined by the equation:

$$d = f - \frac{l}{2n_o} + \left[f^2 - \left(\frac{l}{2n_o}\right)^2\right]^{1/2} + l_r\left(\frac{n_r - 1}{n_r}\right)$$

where:
f is the focal length of the concave mirror;
l is the active length of the pump head;
$n_o$ is the index of refraction at the center of the pump head; and
$l_r$ and $n_r$ are the crystal length and index of refraction, respectively, of the rotating means; and a half-wave plate to rotate the second polarization such that an output from the half-wave plate has the incoming polarization.

3. An apparatus for minimizing depolarization of a laser beam in an injection-locked laser ring cavity due to thermally induced stress birefringence in a solid state gain medium, comprising:

a coupler for transmitting and reflecting a polarized laser beam to a movable mirror, and for transmitting the laser beam as output;

the movable mirror for redirecting the laser beam to a polarizing beamsplitter;

the polarizing beamsplitter for redirecting the laser beam in a first direction through a pump head and a first means for rotating polarization;

a concave mirror being disposed a distance d from the pump head, for reflecting the laser beam through the pump head and the first rotating means in a second direction, with the second direction being opposite the first direction;

the concave mirror having a focal length; the pump head having an active length, a center, and an index of refraction; the first rotating means having a crystal length and an index of refraction; and the distance d being determined by the equation:

$$d = f - \frac{l}{2n_o} + \left[f^2 - \left(\frac{l}{2n_o}\right)^2\right]^{1/2} + l_r\left(\frac{n_r - 1}{n_r}\right)$$

where:
f is the focal length of the concave mirror;
l is the active length of the pump head;
$n_o$ is the index of refraction at the center of the pump head; and
$l_r$ and $n_r$ are the crystal length and index of refraction, respectively, of the first rotating means;
a second means for rotating the polarization of the laser beam after the laser beam has traveled through the first rotating means, the pump head and the polarizing beamsplitter in the second direction; and
a high reflectance mirror for reflecting the laser beam to the coupler, whereby
a first part of the laser beam is reflected to the moveable mirror and a second part of the laser beam passes through the coupler as output.

4. The apparatus, for minimizing depolarization of a laser beam, as defined in claim 3 wherein:
the laser ring cavity has a length and a single frequency longitudinal mode, and the laser beam has a laser frequency; and
the moveable mirror has a position capable of being adjusted in real time to vary the cavity length to maintain the single frequency longitudinal mode at the laser frequency.

* * * * *